United States Patent
Adachi et al.

(10) Patent No.: US 10,608,493 B2
(45) Date of Patent: Mar. 31, 2020

(54) STATOR FOR ROTARY ELECTRIC MACHINE HAVING DISTRIBUTED WINDING STRUCTURE

(71) Applicant: HONDA MOTOR CO., LTD., Tokyo (JP)

(72) Inventors: Yoshiyuki Adachi, Saitama (JP); Toshitaka Kato, Saitama (JP); Masayuki Inada, Saitama (JP); Mitsuo Nakazumi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 128 days.

(21) Appl. No.: 15/955,155

(22) Filed: Apr. 17, 2018

(65) Prior Publication Data

US 2018/0301950 A1 Oct. 18, 2018

(30) Foreign Application Priority Data

Apr. 18, 2017 (JP) .................. 2017-082367

(51) Int. Cl.
*H02K 3/28* (2006.01)
*H02K 3/12* (2006.01)
*H02K 1/16* (2006.01)

(52) U.S. Cl.
CPC .............. *H02K 3/28* (2013.01); *H02K 1/16* (2013.01); *H02K 3/12* (2013.01)

(58) Field of Classification Search
CPC .. H02K 3/28; H02K 3/12; H02K 3/46; H02K 3/48; H02K 3/14; H02K 1/16; H02K 15/0442; H02K 15/045; H02K 15/062

USPC .................................................. 310/201–208
See application file for complete search history.

(56) References Cited

U.S. PATENT DOCUMENTS

| 2012/0001512 | A1* | 1/2012 | Dajaku ................. H02K 1/165 310/195 |
| 2012/0025634 | A1 | 2/2012 | Dajaku |
| 2014/0333170 | A1 | 11/2014 | Sutrisna et al. |
| 2015/0326084 | A1 | 11/2015 | Yamaguchi et al. |

(Continued)

FOREIGN PATENT DOCUMENTS

| CN | 102217172 A | 10/2011 |
| CN | 104143870 A | 11/2014 |
| CN | 104854776 A | 8/2015 |

(Continued)

OTHER PUBLICATIONS

Machine translation of JP-08205444-A. (Year: 1996).*
Sep. 27, 2019, Chinese Office Action issued for related CN Application No. 201810335470.1.

*Primary Examiner* — Michael Andrews
(74) *Attorney, Agent, or Firm* — Paratus Law Group, PLLC

(57) ABSTRACT

There is provided a stator for a rotary electric machine including a stator core including a plurality of teeth arranged along a circumferential direction and a plurality of slots formed between the teeth adjacent to each other, and multi-phase coils in which windings of different phases are respectively wound around the teeth by distributed winding. Each of the slots is provided therein with a plurality of windings forming the coils. The plurality of windings of the different phases are arranged to be overlapped in the circumferential direction in at least a part of the plurality of slots.

2 Claims, 3 Drawing Sheets

(56) References Cited

U.S. PATENT DOCUMENTS

2017/0110923 A1    4/2017  Dajaku

FOREIGN PATENT DOCUMENTS

| CN | 106233584 A |   | 12/2016 |
|----|-------------|---|---------|
| JP | H07-143697 A |  | 6/1995 |
| JP | H08-023650 A |  | 1/1996 |
| JP | 08205444 A | * | 8/1996 |
| JP | H08-205444 A |  | 8/1996 |
| JP | 2001-186736 A |  | 7/2001 |
| JP | 2015-126630 A |  | 7/2015 |
| JP | 2017-046508 A |  | 3/2017 |

* cited by examiner

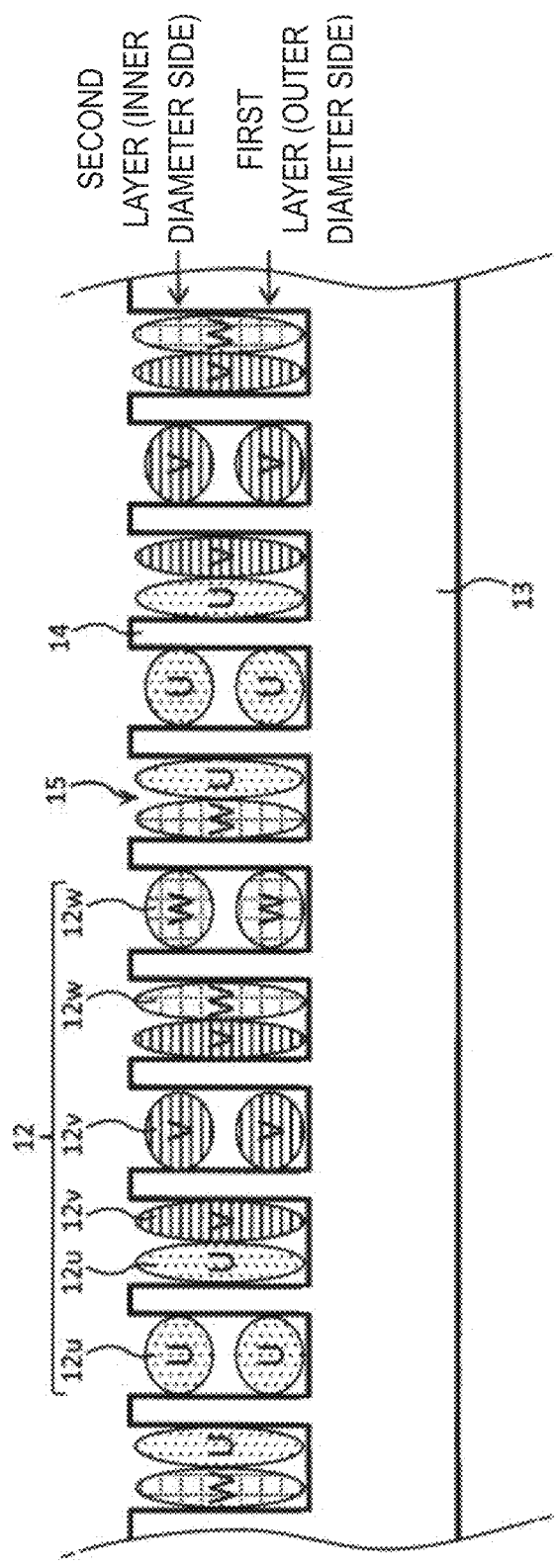

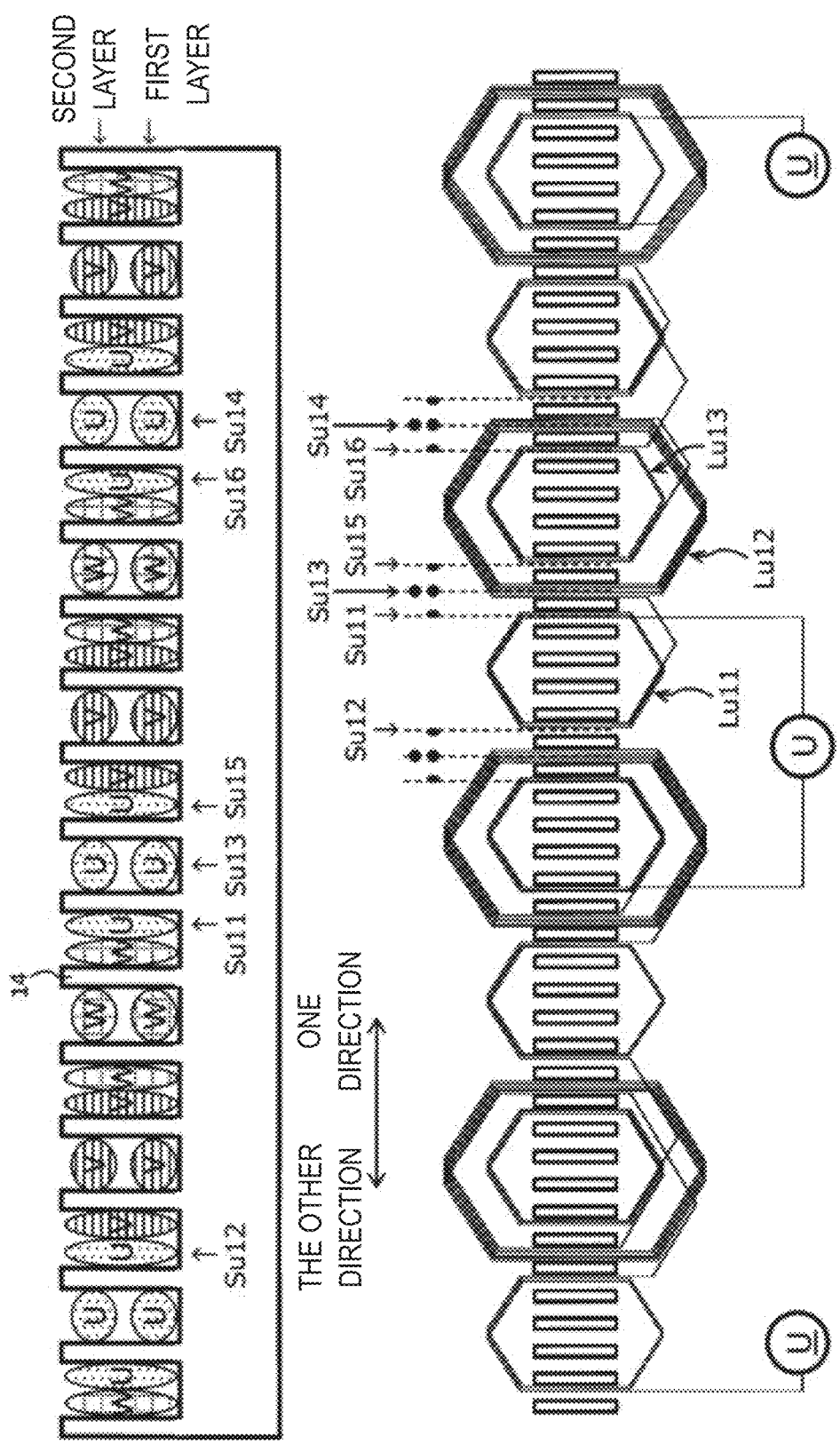

STATOR FOR ROTARY ELECTRIC MACHINE HAVING DISTRIBUTED WINDING STRUCTURE

CROSS-REFERENCE TO RELATED APPLICATION

This application claims priority from Japanese Patent Application No. 2017-082367 filed on Apr. 18, 2017, the entire contents of which are incorporated herein by reference.

TECHNICAL FIELD

The present invention relates to a stator for a rotary electric machine.

BACKGROUND ART

The winding form of a coil provided in a stator of a rotary electric machine can be roughly classified into a "concentrated winding" and a "distributed winding". The concentrated winding has a structure in which windings are wound together around one tooth of a stator core. The concentrated winding stator is simple in the coil form and has a short coil end as compared to the stator distributed winding. However, since the rotating magnetic field generated by the concentrated winding stator is a rectangular wave, vibration or noise due to the harmonic components is relatively large. On the other hand, the distributed winding has a structure in which windings are wound across a plurality of teeth of the stator core. In the distributed winding stator, since coils of different phases are overlapped to each other in the radial direction and the axial direction outside the stator core, a coil end is larger as compared to the concentrated winding stator. However, since the rotating magnetic field generated by the distributed winding stator is close to a sine wave, vibration or noise is smaller, and the output property of the rotary electric machine is superior to the case of the concentrated winding.

In consideration of such difference in characteristics, the distributed winding stator is adopted in many cases to realize a rotary electric machine with small vibration and noise (with high Noise Vibration (NV) property). Further, in order to reduce the harmonic components of a rotating magnetic field generated by the distributed winding stator and to make the rotating magnetic field closer to a sine wave, it is considered that windings of different phases are provided in the same slot of a stator as in a motor disclosed in JP-A-2001-186736 (FIG. 1).

It is considered that the rotating magnetic field generated by the stator having the windings of different phases in the same slot as described above has sine waves different in the degree of approximation from each other in a radial cross-section depending on distribution of the winding of each phase. Accordingly, it is advantageous that the winding of each phase is distributed so as to realize a rotating magnetic field close to a sine wave with small harmonic components.

Accordingly, an aspect of the present invention provides a stator for a rotary electric machine capable of reducing a harmonic component of a rotating magnetic field.

(1) According to an embodiment of the present invention, there is provided a stator for a rotary electric machine. The stator includes:
a stator core (e.g., a stator core 11 in an embodiment to be described below) including a plurality of teeth (e.g., teeth 14 in the embodiment) arranged along a circumferential direction and a plurality of slots (e.g., slots 15 in the embodiment) formed between the teeth adjacent to each other; and
multi-phase coils in which windings (e.g., fine wire bundles 12 in the embodiment) of different phases are respectively wound around the teeth by distributed winding, wherein each of the slots is provided therein with a plurality of windings forming the coils, and
wherein the plurality of windings of the different phases are arranged to be overlapped in the circumferential direction in at least a part of the plurality of slots.

(2) In the stator of (1), the coil of each phase includes:
a first loop (e.g., a first loop Lu1 in the embodiment) for winding around a first number of the teeth, the first loop being formed between one side in the circumferential direction of a first slot (e.g., a first slot Su1 in the embodiment) as a starting end and the other side in the circumferential direction of a second slot (e.g., a second slot Su2 in the embodiment) located to interpose the first number of the teeth from the first slot toward the other side;
a second loop (e.g., a second loop Lu2 in the embodiment) for winding around a second number of the teeth, the second loop being formed to be continuous from a terminal of the first loop between a third slot (e.g., a third slot Su3 in the embodiment) separated by one tooth from the first slot toward the one side in the circumferential direction and a fourth slot (e.g., a fourth slot Su4 in the embodiment) located to interpose the second number of the teeth from the third slot toward the one side; and
a third loop (e.g., a third loop Lu3 in the embodiment) for winding around the first number of the teeth, the third loop being formed to be continuous from a terminal of the second loop between the other side in the circumferential direction of a fifth slot (e.g., a fifth slot Su5 in the embodiment) separated by one tooth toward one side from the third slot and the one side of a sixth slot (e.g., a sixth slot Su6 in the embodiment) located to interpose the first number of the teeth from the fifth slot toward the one side, wherein a relation that the second number=the first number+2 is satisfied, and
wherein a terminal of the third loop is connected to the starting end of the first loop or is a terminal of the coil.

Advantageous Effects

According to (1) and (2), it is possible to provide a stator which generates a rotating magnetic field having approximately a sine wave with small harmonic components.

BRIEF DESCRIPTION OF THE DRAWINGS

FIG. 2 is a schematic view linearly illustrating a part of a circumferential structure of a section of the stator illustrated in FIG. 1; and FIG. 3 is a schematic view illustrating a winding form of a U-phase winding when the stator of the embodiment is viewed from a radial direction.

DESCRIPTION OF EMBODIMENT

Figure 1:
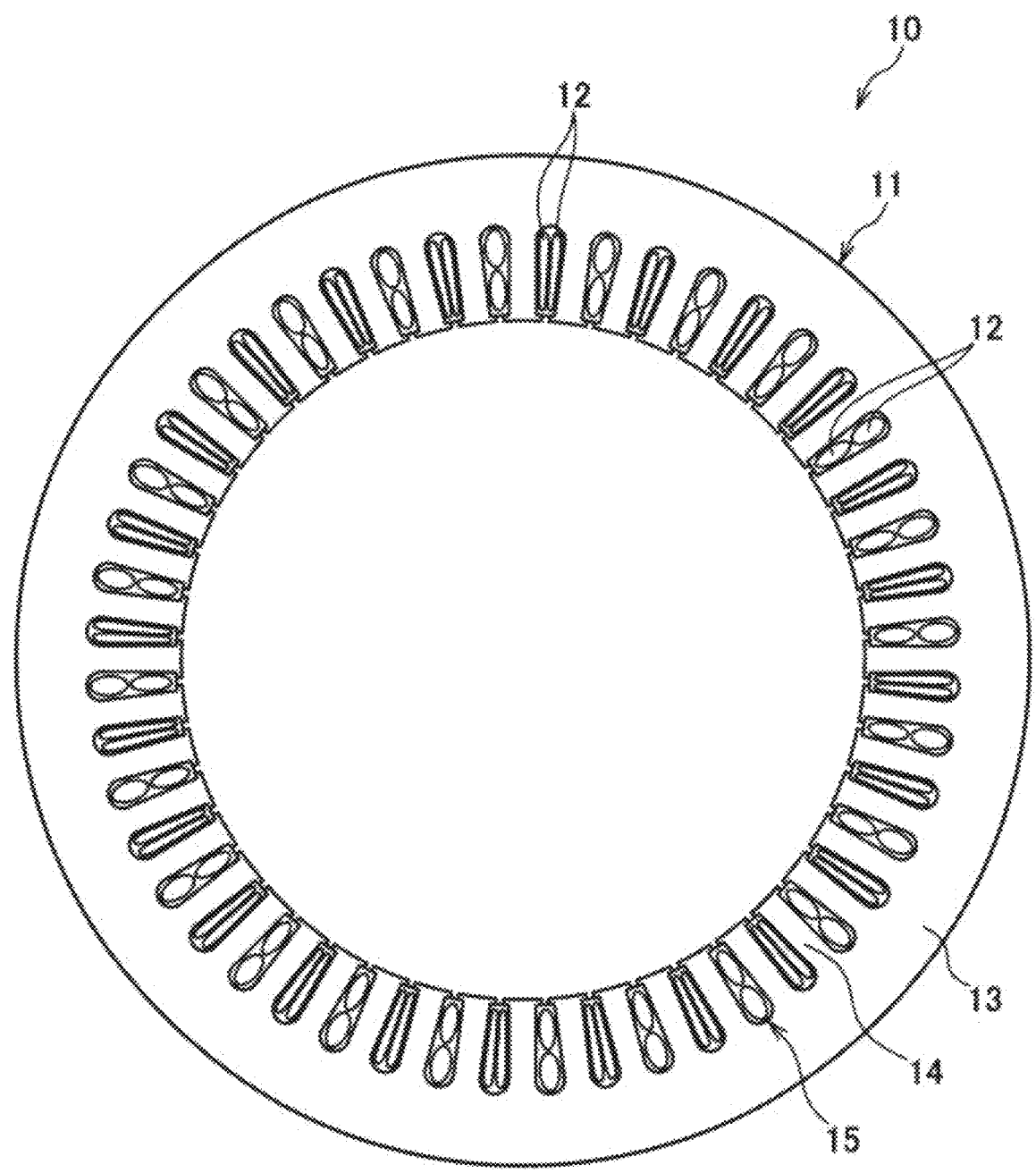
FIG. 1 is a radial cross-sectional view illustrating a stator of a rotary electric machine according to an embodiment.

Hereinafter, an embodiment of the present invention will be described with reference to the drawings. The drawings are assumed to be seen in the direction of reference numerals.

FIG. 1 is a radial cross-sectional view illustrating a stator of a rotary electric machine according to an embodiment. A stator 10 illustrated in FIG. 1 configures a rotary electric machine together with a rotor (not illustrated) provided therein. The rotary electric machine is configured such that the rotor is rotated by an electrical current flowing through coils formed of fine wire bundles (also called as a "winding") 12 wound around teeth 14 of the stator 10.

The stator 10 includes a stator core 11 and coils formed of fine wire bundles 12 wound around the teeth 14. The stator core 11 is formed by laminating a plurality of steel sheets. Each of the steel sheets is a plate-like member which includes an annular stator yoke 13, plural teeth 14 protruding from the stator yoke 13 radially inside at equal intervals, and slots 15 formed at equal intervals in a circumferential direction between adjacent teeth 14. The steel sheet is formed by punching an electromagnetic steel sheet. When the plurality of steel sheets are laminated, the plural slots are formed at equal intervals along the circumferential direction to penetrate through the stator core 11 in an axial direction. The slot 15 is attached with the coils formed of the fine wire bundles 12 which are three-phase (U-phase, V-phase and W-phase) windings wound over the plural teeth 14 by distributed winding.

Hereinafter, the distribution of the winding of each phase accommodated in the slots 15 and the winding form of the winding of each phase over the plural teeth 14.

FIG. 2 is a schematic view linearly illustrating a part of a circumferential structure of a section of the stator 10 illustrated in FIG. 1. As illustrated in FIG. 2, the windings are accommodated in the slot 15 to have a double layered structure in which the windings are arranged to be overlapped in the radial direction or the circumferential direction. As shown with a U-phase winding 12u and a V-phase winding 12v, there are windings of different phases in the slot in which the windings are arranged to be overlapped in the circumferential direction to have a double layered structure.

FIG. 3 is a schematic view illustrating a winding form of the U-phase winding 12u when the stator 10 illustrated in FIG. 1 is viewed from the radial direction. As illustrated in FIG. 3, a U-phase coil formed of the U-phase winding 12u includes a first loop Lu1 for winding around a first number of teeth 14, a second loop Lu2 for winding around a second number of teeth 14, and a third loop Lu3 for winding around the first number of teeth 14. The first loop Lu1 is formed between one side in the circumferential direction of a first slot Su1 as the starting end and the other side in the circumferential direction of a second slot Su2 located to interpose the first number of teeth 14 (four teeth) from the first slot Su1 toward the other side. The second loop Lu2 is formed to be continuous from the terminal of the first loop Lu1 between a third slot Su3 separated by one tooth from the first slot Su1 toward the one side in the circumferential direction and a fourth slot Su4 located to interpose the second number of teeth 14 (six teeth=the first number+2) from the third slot Su3 toward the one side. The third loop Lu3 is formed to be continuous from the terminal of the second loop Lu2 between the other side in the circumferential direction of a fifth slot Su5 separated by one tooth toward the one side from the third slot Su3 and the one side of a sixth slot Su6 located to interpose the first number of teeth 14 from the fifth slot Su5 toward the one side. The terminal of the third loop Lu3 is connected to the starting end of the first loop Lu1 or is the terminal of the U-phase coil.

When viewed from the radial direction, the winding form of the V-phase winding 12v of the embodiment is the same as the winding form of the U-phase winding 12u except that the V-phase winding is located at a position deviated by two slots 15 to the one side in the circumferential direction from the winding position of the U-phase winding 12u described above. Similarly, the winding form of the W-phase winding 12w when viewed from the radial direction in the embodiment is the same as the winding form of the U-phase winding 12u except that the W-phase winding is located at a position deviated by two slots 15 to the other side in the circumferential direction from the winding position of the above-described U-phase winding 12u.

According to the distribution of the winding of each phase in the radial cross section of the coil formed of the three-phase windings as in the above-described embodiment, it is possible to provide a stator which can form a rotating magnetic field having approximately a sine wave with small harmonic components.

The present invention is not limited to the above-described embodiment, and can be appropriately changed or modified.

The invention claimed is:

1. A stator for a rotary electric machine comprising:
    a stator core including a plurality of teeth arranged along a circumferential direction and a plurality of slots formed between the teeth adjacent to each other; and
    multi-phase coils in which windings of different phases are respectively wound around the teeth by distributed winding,
    wherein each of the slots is provided therein with a plurality of windings forming the coils,
    wherein the plurality of slots include a first slot provided therein with the plurality of windings of the different phases which are arranged to be overlapped in the circumferential direction, and a second slot provided therein with the plurality of windings of the same phase which are arranged to be overlapped in a radial direction, and
    wherein the first slot and the second slot are alternately arranged in the circumferential direction.

2. The stator according to claim 1,
    wherein the coil of each phase includes:
        a first loop for winding around a first number of teeth, the first loop being formed between one side in the circumferential direction of the first slot as a starting end and the other side in the circumferential direction of the second slot located to interpose a first number of the teeth from the first slot toward the other side,
        a second loop for winding around a second number of teeth, the second loop being formed to be continuous from a terminal of the first loop between a third slot separated by one tooth from the first slot toward the one side in the circumferential direction and a fourth slot located to interpose the second number of the teeth from the third slot toward the one side, and
        a third loop for winding around the first number of teeth, the third loop being formed to be continuous from a terminal of the second loop between the other side in the circumferential direction of a fifth slot separated by one tooth toward the one side from the third slot and the one side of a sixth slot located to interpose the first number of teeth from the fifth slot toward the one side,
    wherein a relation that the second number=the first number+2 is satisfied, and wherein a terminal of the third loop is connected to the starting end of the first loop or is a terminal of the coil.

\* \* \* \* \*